United States Patent
Zhou et al.

(10) Patent No.: US 6,422,450 B1
(45) Date of Patent: Jul. 23, 2002

(54) NANOTUBE-BASED HIGH ENERGY MATERIAL AND METHOD

(75) Inventors: Otto Z. Zhou; Bo Gao, both of Chapel Hill, NC (US)

(73) Assignee: University of North Carolina, The Chapel, Chapel Hill, NC (US)

( * ) Notice: Subject to any disclaimer, the term of this patent is extended or adjusted under 35 U.S.C. 154(b) by 0 days.

(21) Appl. No.: 09/662,547

(22) Filed: Sep. 15, 2000

Related U.S. Application Data

(62) Division of application No. 09/259,307, filed on Mar. 1, 1999, now Pat. No. 6,280,697.

(51) Int. Cl.[7] .......................... B23K 26/00; C01B 31/02

(52) U.S. Cl. .................. 228/121.85; 423/460; 423/461

(58) Field of Search .................. 219/121.85; 423/460, 423/461; 106/472; 516/32; 427/372.2

(56) References Cited

U.S. PATENT DOCUMENTS

| | | | |
|---|---|---|---|
| 5,627,140 A | * | 5/1997 | Fossheim et al. |
| 5,698,175 A | * | 12/1997 | Hiura et al. |
| 6,146,227 A | * | 11/2000 | Mancevski |
| 6,183,714 B1 | * | 2/2001 | Smalley et al. |
| 6,187,823 B1 | * | 2/2001 | Haddon et al. |
| 6,203,864 B1 | * | 3/2001 | Zhang et al. |
| 6,250,984 B1 | * | 6/2001 | Jin et al. |
| 6,277,318 B1 | * | 8/2001 | Bower et al. |
| 6,280,697 B1 | * | 8/2001 | Zhou et al. |
| 2001/0001654 A1 | * | 5/2001 | Yudasaka et al. |
| 2001/0001681 A1 | * | 5/2001 | Zhang et al. |
| 2001/0004471 A1 | * | 6/2001 | Zhang |
| 2001/0010809 A1 | * | 8/2001 | Haddon et al. |
| 2001/0016283 A1 | * | 8/2001 | Shiraishi et al. |
| 2001/0016608 A1 | * | 8/2001 | Haddon et al. |

FOREIGN PATENT DOCUMENTS

JP      02000290008 A    * 10/2000

OTHER PUBLICATIONS

Derwent (2000–239408) Bower et al.*
Dewent (2000–594162) Gao et al.*
WO 98/39250 Smalley et al. (Sep. 11, 1998).*
WO 00/73203 A1 Mau et al. (Dec. 7, 2000).*
Science, vol. 270, Oct. 27, 1995, "Mechanism for Lithium Insertion in Carbonaceous Materials" J.R. Dahn et al., pp. 590–593.
Science, vol. 263, Mar. 25, 1994, "Defects in Carbon Nanostructures", O.Zhou et al., pp. 1744–1747.
Nature, vol. 388, Jul. 17, 1997, "Conductivity Enhancement in single–walled carbon nanotube bundles doped with K and Br", R.S. Lee et al., pp. 255–257.
Appl. Phys. A 67, 1998, "Synthesis and structure of pristine and alkali–metal–intercalated single–walled carbon nanotubes", C. Bower et al., pp. 47–52.

(List continued on next page.)

Primary Examiner—M. Alexandra Elve
Assistant Examiner—Kiley Stoner
(74) Attorney, Agent, or Firm—Burns, Doane, Swecker & Mathis, L.L.P.

(57) ABSTRACT

A carbon-based material containing an allotrope of carbon, such as single-walled carbon nanotubes, is capable of accepting and intercalated alkali metal. The material exhibits a reversible capacity ranging from approximately 650 mAh/g–1,000 mAh/g. The high capacity of the material makes it attractive for a number of applications, such as a battery electrode material. A method of producing a single-walled carbon nanotube material includes purifying an as-recovered nanotube material, and depositing the purified material onto a conductive substrate. The coated substrate is incorporated into an electrochemical cell, an its ability to accept intercalated materials, such as an alkali metal (e.g.—lithium) is measured.

17 Claims, 6 Drawing Sheets-

OTHER PUBLICATIONS

Carbon 37, 1999, "Electrochemical storage of lithium multiwalled carbon nanotubes", E.Frackowiak, et al., pp. 61–69.

Scientific American, Oct. 1991, "Fullerenes", Robert F. Curl et al., pp. 53–63.

Science News, vol. 140, "Scientists ponder the surprising properties of $C_{60}$ and its siblings", Elizabeth Pennisi, pp. 120–123.

Technology Review, Jan. 1994, "The Third Coming of Carbon", Hugh Aldersey-Williams, pp. 51–62.

Chemistry, 1992, "More fun with buckyballs", (2 pages).

Materials & Electrochemical Research Corporation, "Buckytubes", (5 pages).

Popular Science, Aug. 1991, "Buckyball, The Magic Molecule", Edward Edelson, pp. 52–57 & 87.

Mar. 30, 1991, "Profile emerges of well-rounded molecule", I. Peterson, pp. 197.

The Electrochemical Society Interface, vol. 3, No. 1, Spring 1994, "Fullerenes, The Society forms a new Group", Rodney S. Ruoff, pp. 29–33.

Apr. 10, 1993, "Synthesis in Soot: The New Molecular Cages".

1991 Atomic Tech, Jan. 1992, "Better Living through Buckyballs", pp. 74–75.

Industry Week, Nov. 4, 1991, "Buckminsterfullerenes" John Teresko, pp. 38–44.

Nature, vol. 388, Jul. 17, 1997, "Evidence for charge transfer in doped carbon nanotube bundles from Raman scattering" A.M. Rao et al., pp. 257–259.

J. Appl. Phys, 79 (7), Apr. 1, 1996, "Observation of potassium–intercalated carbon nanotubes and their valence–band excitation spectra", S. Suzuki et al., pp. 3739–3743.

Science, vol. 273, Jul. 26, 1996, "Crystalline Ropes of Metallic Carbon Nanotubes", Andreas Thess et al., pp. 483–487.

Chemical Physics Letters, 285 (1998), "In–situ TEM and EELS studies of alkali–metal intercalation with single–walled carbon nanotubes", S. Suzuki et al., pp. 230–234.

Physical Review Letters, vol. 80, No. 25, Jun. 22, 1998, "Reversible Intercalation of Charged Iodine Chains into Carbon Nanotube Ropes", L. Grigorian et al., pp. 5560–5563.

Chemical Physics Letters 288 (1998), "Intercalation and partial exfoliation of single–walled carbon nanotubes by nitric acid", C. Bower et al., pp. 481–486.

Chemical Physics Letters 282 (1998), "Purification of single–wall carbon nanotubes by ultrasonically assisted filtration", Konstantine B. Shelimov et al., pp. 429–434.

Nature, vol. 358, Jul. 16, 1992, "Large–scale synthesis of carbon nanotubes", T.W. Ebbesen et al., pp. 220–222.

J. Electrochem Soc., vol. 139, No. 4, Apr. 1992, "Li Metal–Free Rechargeable $LiMn_2O_4$/Carbon Cells: Their Understanding and Optimization", D. Guyomard et al., pp. 937–948.

J. Electroanal Chem., 219 (1987), "The Cathodic Decomposition of Propylene Carbonate in Lithium Batteries", Masayasu Arakawa et al., pp. 273–280.

J. Electrochem. Soc. vol. 143, No. 12, Dec. 1996, "Effect of Mechanical Grinding on the Lithium Intercalation Process in Graphites and Soft Carbons", F. Disma et al., pp. 3959–3972.

"Elastic and Mechanical Properties of Carbon Nanotubes" L. Vaccarini et al., pp. 406.

Physical Review Letters, vol. 80, No. 25, Jun. 22, 1998, "Position of K Atoms in Doped Single–Walled Carbon Nanotube Crystals", Guanghua Gao et al., pp. 5556–5559.

"Mechanical Damage of Carbon Nanotubes by Ultrasound", Apr. 1996, K.L. Lu et al., pp. 814–816.

J. Am. Chem. Soc., 1992, 114, "Electrochemical Intercalation of Lithium into Solid $C_{60}$", Yves Chabre et al., pp. 764–766.

Science, vol. 264, Apr. 22, 1994, "A Mechanism of Lithium Storage in Disordered Carbons", Kenji Sato et al., pp. 556–558.

J. Mater, Res., vol. 5, No. 2, Feb 1990, "Hydrogen–alkali–metal–graphite ternary intercalation compounds", Toshiaki Enoki et al., pp. 435–465.

* cited by examiner

NANOTUBE-BASED HIGH ENERGY MATERIAL AND METHOD

This application is a division of U.S. Appl. Ser. No. 09/259,307, filed Mar. 1, 1999, now U.S. Pat. No. 6,280,697.

STATEMENT REGARDING FEDERALLY SPONSORED RESEARCH OR DEVELOPMENT

At least some aspects of this invention were made with Government support under contract no. N00014-98-1-0597. The Government may have certain rights in this invention.

BACKGROUND OF THE INVENTION

In the description that follows references are made to certain compounds, devices and methods. These references should not necessarily be construed as an admission that such compounds, devices and methods qualify as prior art under the applicable statutory provisions.

The verification of the existence of a third form of carbon termed "fullerenes" in 1990 touched off an intense wave of research and development aimed at maximizing the potential of this "new" material. The term "fullerene" is often used to designate a family of carbon molecules which have a cage-like hollow lattice structure. These "cages" may be different forms, such as spheres ("buckyballs"), or tubes ("nanotubes"). See, for example, Robert F. Curl and Richard E. Smalley, *Fullerenes, Scientific American,* October 1991.

With the increasing importance of batteries for a wide variety of uses, ranging from portable electronics to power supply devices for spacecraft, there is a long-felt need for new materials with higher energy densities. The energy density of a material can be quantified by measuring the amount of electron-donating atoms that can reversibly react with the material. One way of obtaining such a measurement is by setting up an electrochemical cell. The cell comprises a container housing an electrolyte, one electrode made of the electron-donating material (e.g.—an alkali metal), another electrode made of the material whose capacity is being measured (e.g.—a carbon based material), and an electrical circuit connected to the electrodes. Atoms of the electron-donating material undergo an oxidation reaction to form ions of the donating material, and free electrons. These ions are absorbed by the opposite electrode, and the free electrons travel through the electrical circuit. Since the number of electrons "given away" by each atom of the electron-donating material is known, by measuring the number of electrons transferred through the electrical circuit, the number of ions transferred to the material being investigated can be determined. This quantity is the specific capacity of the material, and can be expressed as milliampere-hours per gram of the material. For example, the maximum specific (reversible) capacity of graphite to accept lithium is reported to be approximately 372 mAh/g. Because one lithium ion is transferred to the graphite electrode for every electron released, the specific capacity can be expressed in terms of the stoichiometry of the electrode material. For graphite, the electrode material can be characterized as $LiC_6$. See, for example, J. R. Dahn et al., *Mechanisms for Lithium Insertion in Carbonaceous Materials, Science,* volume 270, Oct. 27, 1995.

Lithium intercalated graphite and other carbonaceous materials are commercially used as electrodes for advanced Li-ion batteries. See, for example, M. S. Whittingham, editor, *Recent Advances in rechargeable Li Batteries, Solid State Ionics,* volumes 3 and 4, number 69, 1994; and D. W. Murphy et al., editors, *Materials for Advanced Batteries,* Plenum Press, New York, 1980. The energy capacities of these conventional battery materials is partially limited by the $LiC_6$ saturation Li concentration in graphite (equivalent to 372 mAh/g).

Carbon nanotubes have attracted attention as potential electrode materials. Carbon nanotubes often exist as closed concentric multi-layered shells or multi-walled nanotubes (MWNT). Nanotubes can also be formed as a single-walled nanotubes (SWNT). The SWNT form bundles, these bundles having a closely packed 2-D triangular lattice structure.

Both MWNT and SWNT have been produced and the specific capacity of these materials has been evaluated by vapor-transport reactions. See, for example, O. Zhou et al., *Defects in Carbon Nanotubes, Science:*263, pgs. 1744–47, 1994; R. S. Lee et al., *Conductivity Enhancement in Single-Walled Nanotube Bundles Doped with K and Br, Nature:* 388, pgs. 257–59, 1997; A. M. Rao et al., *Raman Scattering Study of Charge Transfer in Doped Carbon Nanotube Bundles, Nature:* 388, 257–59, 1997; and C. Bower et al., *Synthesis and Structure of Pristine and Cesium Intercalated Single-Walled Carbon Nanotubes, Applied Physics:* A67, pgs. 47–52, spring 1998. The highest alkali metal saturation values for these nanotube materials was reported to be $MC_8$ (M=K, Rb, Cs). These values do not represent a significant advance over existing commercially popular materials, such as graphite.

Therefore there exists a long-felt, but so far unfulfilled need, for a material having improved properties. There exists a need for a material having improved properties that make it useful in batteries and other high energy applications. In particular, there is a need for a material having a higher energy density than those materials currently being used in such applications.

SUMMARY OF THE INVENTION

These and other objects are attained according to the principles of the present invention.

One aspect of the present invention includes a carbon-based material having an allotrope of carbon with an intercalated alkali metal. The material having a reversible capacity greater than 900 mAh/g.

Another aspect of the present invention includes a material having single-walled carbon nanotubes and intercalated lithium metal. The material having a reversible capacity greater than 550 mAh/g.

In another aspect of the present invention, an article of manufacture includes an electrically conductive substrate having a film disposed thereon. The film includes single-walled carbon nanotubes and intercalated lithium metal. The article having a reversible capacity greater than 550 mAh/g.

In yet another aspect of the present invention, a method of manufacture includes creating a mixture by adding a carbon-based material having at least approximately 80% single-walled nanotubes to a solvent, immersing a substrate within the mixture, and driving off the solvent thereby leaving a film of the carbon-based material on at least one surface of said substrate.

In yet another aspect of the present invention, an electrode material having a reversible capacity greater than 550 mAh/g is produced by creating a mixture. The mixture is obtained by adding a carbon-based material having at least approximately 80% single-walled nanotubes to a solvent, immersing a substrate within the mixture, and volatizing the solvent thereby leaving a film of the carbon-based material on at least one surface of said substrate.

BRIEF DESCRIPTION OF THE DRAWING FIGURES

DETAILED DESCRIPTION OF PREFERRED EMBODIMENTS

A carbon-based single-walled nanotube (SWNT)-containing material can be formed by a number of techniques, such as laser ablation of a carbon target, decomposing a hydrocarbon, and setting up an arc between two graphite electrodes.

For example, one suitable technique for producing SWNT bundles is described in C. Bower et al., *Synthesis and Structure of Pristine and Cesium Intercalated Single-Walled Carbon Nanotubes*, Applied Physics: A67, pgs. 47–52, spring 1998, the disclosure of which, in its entirety, is incorporated herein by reference.

Figure 1:
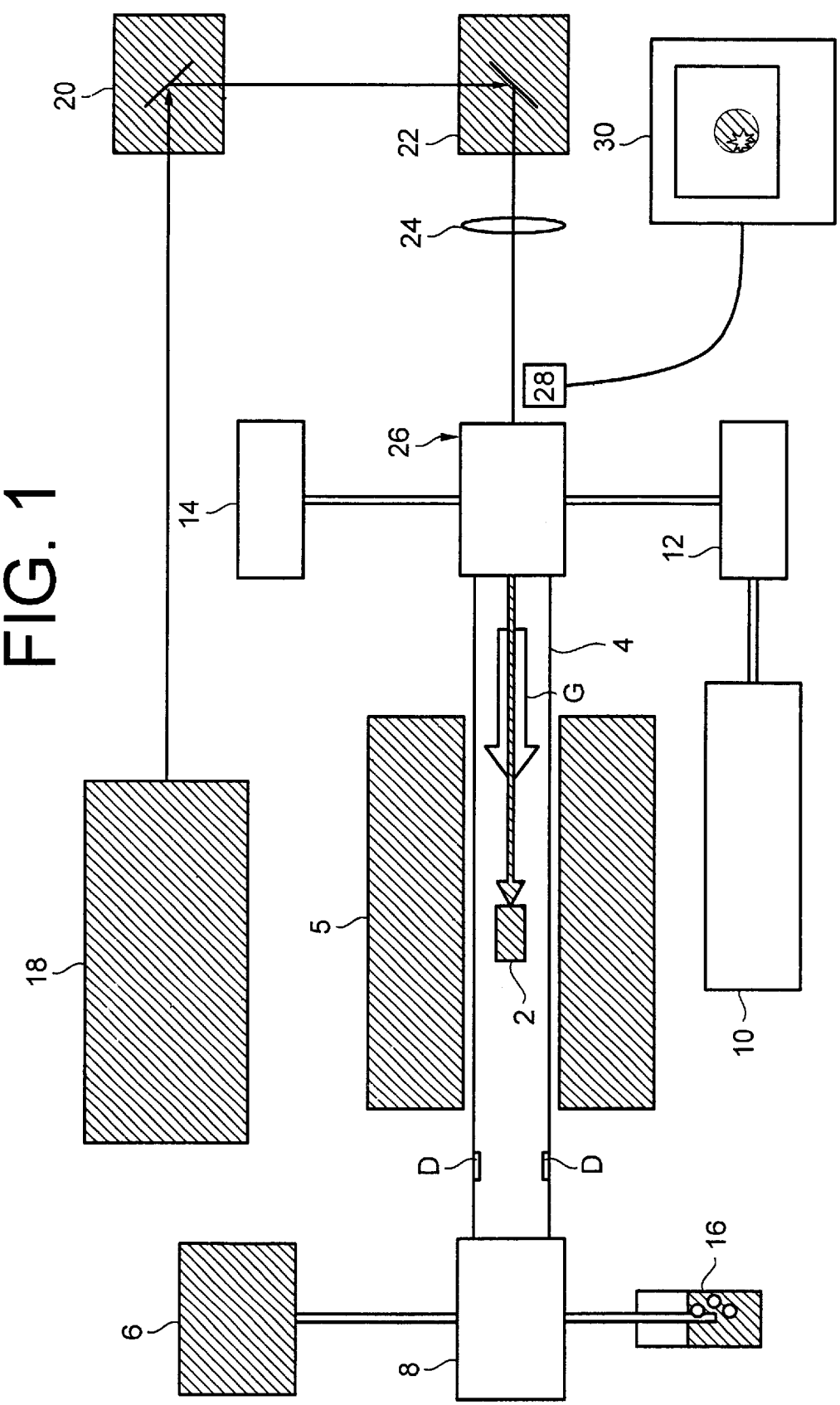
FIG. 1 is a schematic illustration of a laser ablation system used to produce a carbon-based material comprising single-walled nanotubes.

As illustrated in FIG. 1, according to this technique, a suitable target 2 is placed within a quartz tube 4. Preferably, the target 2 is made from graphite and contains a Ni/Co catalyst. In a preferred embodiment, the target is formed from a graphite powder mixed with 0.6 at. % Ni and 0.6 at. % Co, and graphite cement.

The tube 4 is evacuated by a vacuum pump 6 which is attached to one end of the tube 4 by a suitable connector 8. A flow of inert gas G, such as argon, is introduced into the tube 4 by a suitable source, such as a tank 10. Various devices, such as a flow controller and/or a pressure may be attached to the system for controlling and monitoring the flow of inert gas G into the tube 4. The pressure of inert gas is maintained at a suitable level, such as approximately 800 torr. A suitable collection device 16 for the inert gas leaving the tube 4, such as a water-filled bottle, may be connected to the end of the tube via connector 8.

The target is heated to a temperature of approximately 1150° C. within the tube 4 by a tube heater 5, which preferably has a programmable controller.

An energy source 18, such as a pulsed Nd:YAG laser, is used to ablate the target 2 at high temperatures. Preferably, the first and/or second harmonic beam of the laser (i.e.— 1064 nm and 532 nm, respectively) are used to ablate the target. Suitable devices, such as a horizontal scanner 20 and a vertical scanner 22 may be associated with the energy source. The beam B is focused onto the target 2 by a suitable lens member 24.

One end of the tube can be closed by a transparent window 26, such as a quartz window, in order to permit transmission of a laser beam and monitoring of the laser ablation process. Suitable monitoring devices may be utilized to this end. For example, a CCD device may be directed through the window 26, and output transmitted to a monitoring device 30 which permits viewing and recording of the ablation process.

As the target is ablated, nanotube-containing material is transported downstream by the inert gas flow, and forms deposits D on the inner wall of tube 4. These deposits are removed to recover the nanotube-containing material.

The carbon-based material formed according to the technique described above, as recovered, has been analyzed and found to contain 50–70 volume % of SWNTs, with individual tube diameters of 1.3–1.6 nm and bundle diameters of 10–40 nm. The bundles are randomly oriented. The impurity phases include amorphous carbon nanoparticles and the metal catalysts which constitute 1 at. % of the total target material.

According to the present invention, the as-recovered materials are purified by a suitable purification process. In a preferred embodiment the nanotube material is placed in a suitable liquid medium, such as an alcohol. The nanotubes are kept in suspension within the liquid medium for several hours using a high-power ultrasonic horn, while the suspension is passed through a micro-pore membrane. Optionally, the as-recovered material ca be washed with an acid prior to being placed in suspension.

The above-described application of ultrasonic energy may also serve to damage or create defects in the nanotubes. This may actually be beneficial by serving to increase the ability to accommodate intercalated materials, as will be described in further detail below.

Transmission and scanning electron microscopy examinations indicate that the purified materials contain over 80% by volume of SWNTs bundles.

Figure 2:
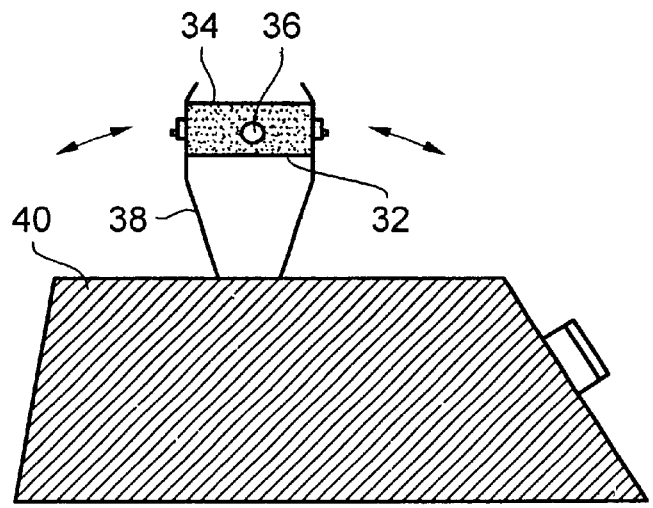
FIG. 2 is a schematic illustration of a ball-milling apparatus.

Optionally, the purified materials can be further processed by ball-milling. This process is generally depicted in FIG. 2. A sample of purified SWNTs 32 is placed inside a suitable container 34, along with the milling media 36. The container is then shut and placed within a suitable holder 38 of a ball-milling machine. According to the present invention, the time that the sample is milled can vary. For example, samples were milled for period of time ranging from approximately 1–20 minutes.

Figure 3A:
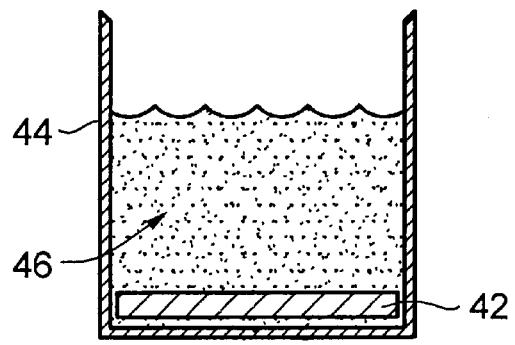
FIG. 3A is a schematic illustration of a film forming technique of the present invention.
Figure 3B:
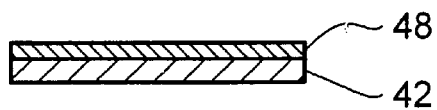
FIG. 3B is a cross sectional view of a nanotube-coated substrate of the present invention.

One advantage of the nanotube materials of the present invention is that they can be rather easily deposited as a film onto a substrate material. For example, a sample of the purified, and optionally milled, nanotube material can be solution-deposited on an appropriate substrate. Such a process is generally depicted in FIG. 3A. A suitable substrate 42 is placed in the bottom a container 44. In a preferred embodiment, the substrate is a conductive material, such as copper or nickel. The substrate 42 may be formed as a flat copper plate. While the size of plate may vary, a plate having an area that is 1 cm×1 cm can be used. A mixture of the SWNT material and a suitable solvent, such as alcohol, is placed into a suspension 46 by the application of ultrasonic energy. The suspension 46 is then placed into the container 44. The substrate 42 is then immersed in the mixture 46. The solvent is volatized, either through passive evaporations, or can be actively driven off, so that a film 48 of the SWNT material is left covering at least the upper surface of the substrate 42, as illustrated in FIG. 3B. The coated substrate is then subjected to an appropriate heat treatment to drive off any remaining solvent and to promote adhesion of the film 48 to the substrate 42. For example, the coated substrate is can be heated to approximately 130°–150° C. in a vacuum for a few hours, or sufficient time to drive off the solvent.

A SWNT film of formed consistent with the above-described techniques. has several advantages over conventional carbon-based material films. For example, graphite is often used as an electrode material. However, it is difficult to form films made from graphite. Therefore it is necessary to add binder materials to the graphite in order to promote film formation. However, the addition of binder materials adversely affects the electrical properties of the electrode material. By the above-described technique of the present invention, it is possible to lay down films of SWNT material onto a substrate without the use of such binder materials, thereby avoiding the above mentioned disadvantages associated therewith.

Moreover, a conductive aid, such as carbon black, is typically added to the graphite material in order to enhance the conductivity of the material. The addition of carbon black adds to the cost of forming the product. However, the SWNT material of the present invention possesses excellent conductivity and does not require the addition of expensive conductive aids, such as carbon black.

Figure 4:
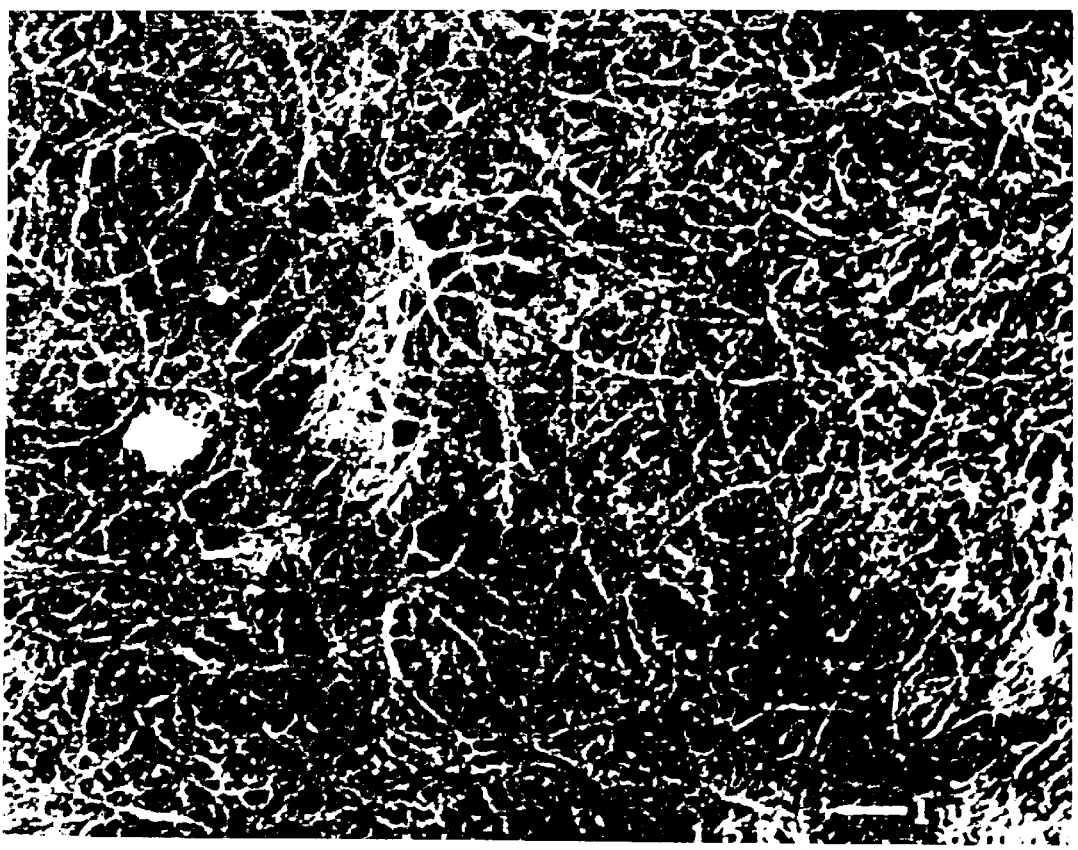
FIG. 4 is a Scanning Electron Microscope (SEM) micrograph of a nanotube film formed according to the present invention.

A film formed according to the present invention was analyzed under a scanning electron microscope (SEM). FIG. 4 is a photomicrograph showing the purity and morphology of the SWNT film.

A SWNT material produced according to principles described above unexpectedly possesses energy density properties that exceed those possessed by other carbon-based materials.

Figure 5:
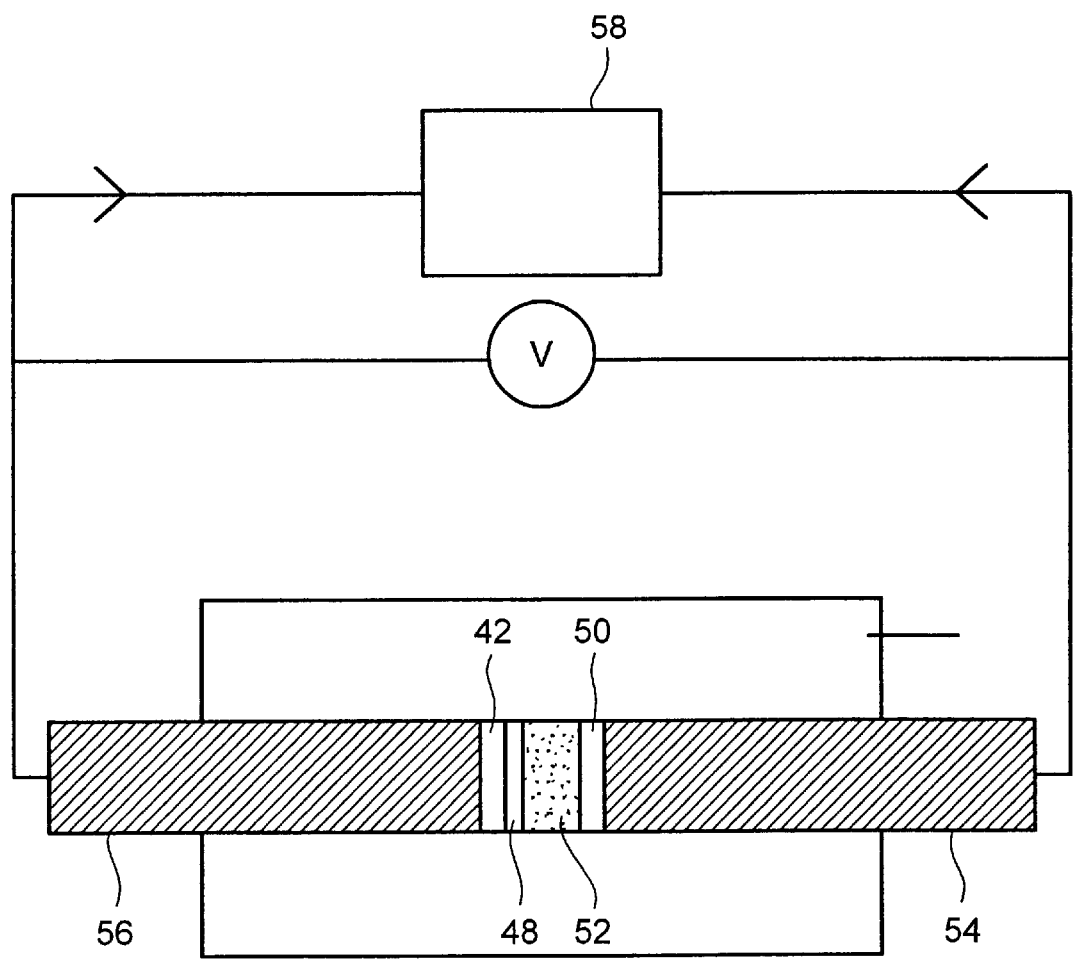
FIG. 5 is a schematic illustration of an electrochemical cell incorporating an electrode material of the present invention.

The energy density, or ability of the SWNT material of the present invention to accept intercalated materials, such as alkali metals, was measured by constructing a electrochemical cell, similar to that described in the Background section above. An electrochemical cell incorporating the SWNT material of the present invention is schematically illustrated in FIG. 5.

A cell was constructed with a lithium foil electrode 50 and a copper substrate plate 42 having a SWNT film 48 formed as described above, as the second electrode. A polypropylene filter soaked with an electrolyte 52 was placed between the two electrodes. In a preferred embodiment, a 1M (1-molar) solution of $LiClO_4$, and 1:1 volume ratio of EC (ethylene carbonate) and DMC (dimethyl carbonate), was used as the electrolyte. The measured ionic conductivity of the liquid electrolyte is $10^3$S/cm. Electrical contacts were made by two stainless steel plungers 54, 56 pressed against the electrodes. A current source 58 is connected to the plungers. The cell was discharged and charged using galvanostatic mode at a rate of 50 mAh/g and between 0.0–3.0V. The specific Li capacities (amounts of Li intercalated per unit of carbon) were calculated from the time and the current used as described above in the Background.

The purified SWNTs of the present invention have significantly higher capacities than conventional materials. The capacity of purified SWNT materials of the present invention have exhibited reversible capacities well above 550 mAh/g, and, in particular, of approximately 650 mAh/g (equivalent to $Li_{1.7}C_6$). The reversible capacity can be further increased to levels of 900–1,000 mAh/g ($Li_{2.4+}C_6$) by the above described ball-milling procedure.

Figure 6:
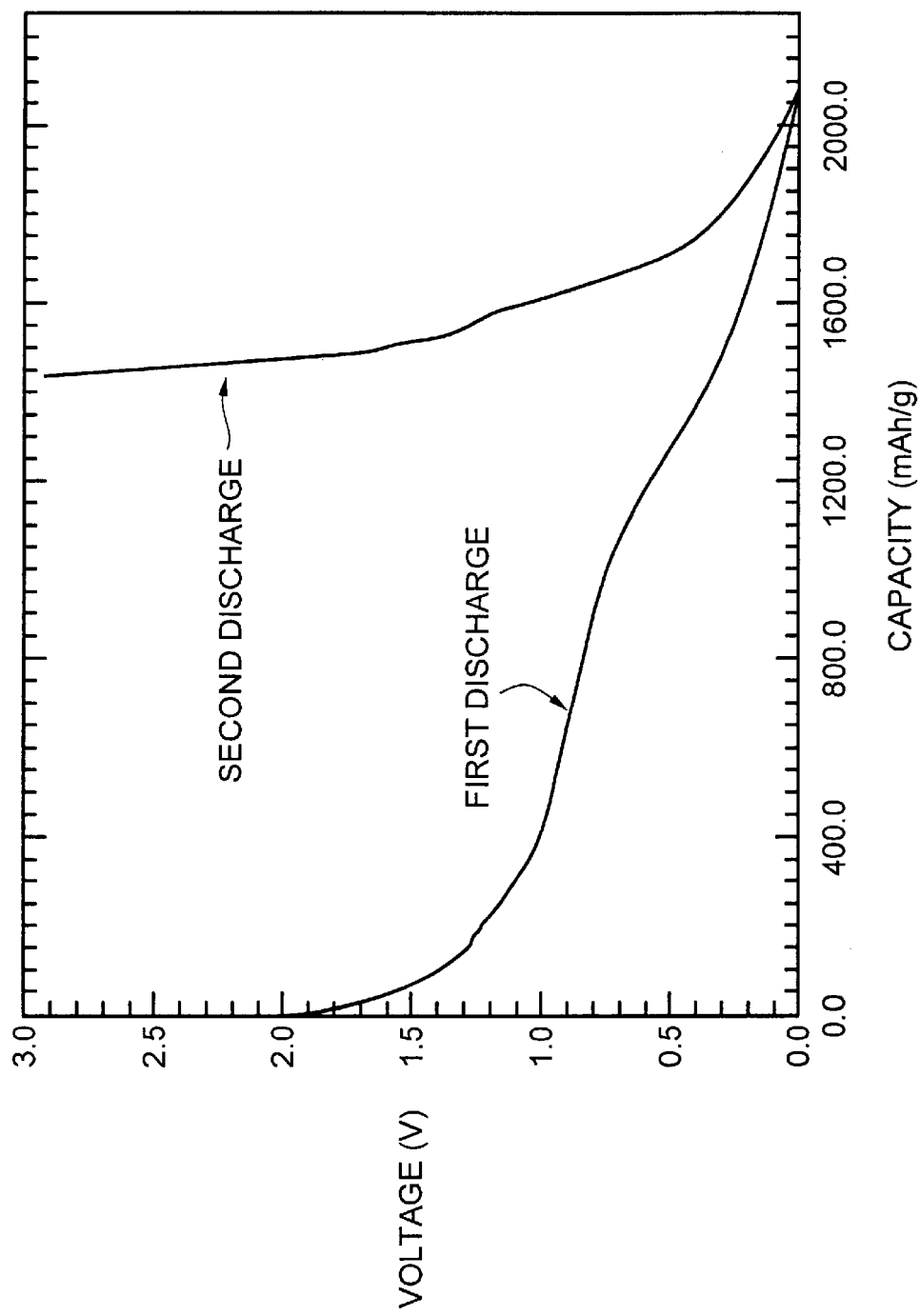
FIG. 6 is a graph showing the charge-discharge characteristics of a purified nanotube material formed according to the principles of the present invention.

As shown by the voltage-capacity plots in FIG. 6, a fully lithiated purified SWNT sample showed a total capacity of approximately 2000 mAh/g ($Li_{5.4}C_6$). The reversible part, defined as the capacity displayed after the second discharge, is approximately 600 mAh/g. This is equivalent to $Li_{1.6}C_6$ which is more than 60% higher than the theoretical value for graphite. Further cycling only resulted in a slight reduction in the Li capacity. Several samples from different batches of material were measured under the same conditions and showed reversible capacities in the range of 550–650 mAh/g. The magnitude of the irreversible capacity (defined as the capacity difference between the first and the second discharge) varied slightly when different electrolytes were used.

Figure 7:
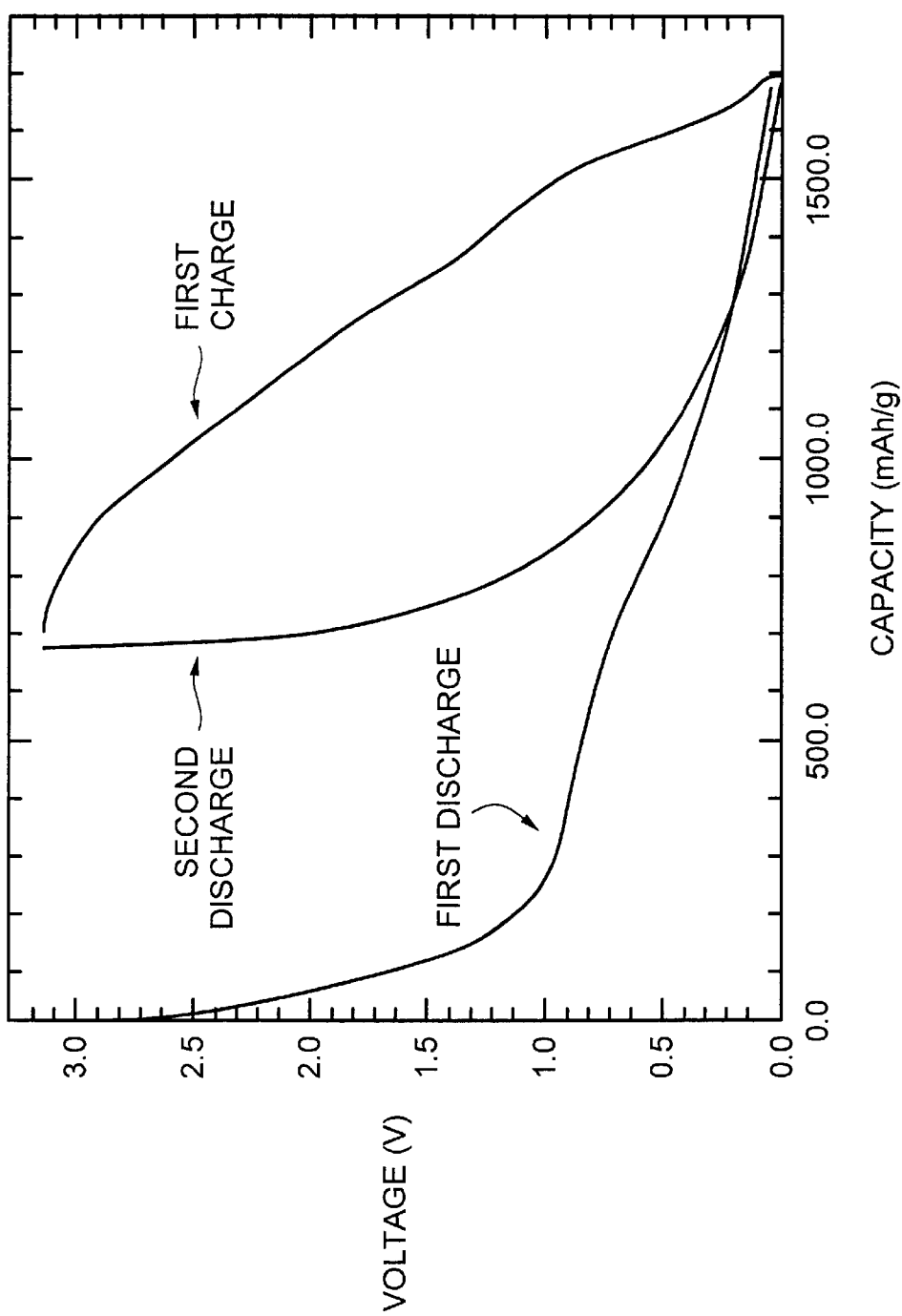
FIG. 7 is a graph showing charge-discharge characteristics of a nanotube material after being processed by ball milling.

As illustrated in FIG. 7, mechanical ball-milling of the SWNTs led to a significant enhancement of the reversible capacity, and a substantial reduction of the irreversible capacity. Discharge-charge characteristics of SWNTs ball-milled for 1–20 minutes have been measured and analyzed. X-ray diffraction and TEM data indicate that ball-milling induces disorder and cuts SWNT bundles to shorter and opened segments. A change in morphology was also observed. The porosity of the SWNT materials was reduced after ball-milling. A SWNT sample that had been ball-milled for 5 minutes showed a reversible capacity of 830 mAh/g and an irreversible capacity of 400 mAh/g.

A SWNT sample that had been ball milled for 10 minutes showed a reversible capacity increase to a level in excess of 900 mAh/g ($Li_{2.4}C_6$), and more particularly, to around 1,000 mAh/g. The irreversible capacity decreased to 600 mAh/g. Very little reduction in the reversible capacity was observed upon further cycling. Similar to the purified SWNTs without ball-milling, the sample showed a large hysteresis upon charging.

Another important performance parameter is how the rate of charging and discharging affects the capacity of the material. Some applications, such as electrical vehicles, require the electrode material to operate under high rate charging and discharging conditions. Generally, the capacity of the material decreases with an increased rate. The above described SWNT sample that had been ball milled for ten minutes, when measured at a rate of 50 mAh/g, exhibited a reversible capacity of 1,000 mAh/g. A 50 mAh/g is a typical testing rate. When the same sample was tested at a rate of 500 mA/g, a very high capacity of 600 mAh/g was maintained.

The effect of the ball-milling procedure on reversible capacity can be explained as follows. Normally, the inner core spaces of the SWNTs are not accessible to intercalated materials because they have a closed structure and Li ions can not diffuse through the carbon pentagons and hexagons which form the lattice of the SWNTs under the current experimental conditions. Therefore, such intercalated materials are normally accommodated in the spaces between the SWNTs in the bundles formed thereby. Mechanical ball-milling increases the defect density and reduces the length of the SWNTs, and therefore facilitates $Li^+$diffusion into the nanotubes. For instance, the ends of the nanotubes can be broken, thereby forming openings in the nanotubes. Considerable amounts of $Li^+$ions can readily diffuse into these structurally damaged SWNTs through the opened ends, and perhaps through other defect sites, to give an enhanced capacity. As noted above, the application of ultrasonic energy to the SWNTs during purification can also introduce such defects, thereby having a similar effect on the capacity of the SWNT material.

Samples that were milled in excess of 10 minutes started to show a drop in reversible capacity. It is believed that this drop is caused by excessive damage to the lattice structure of the nanotubes, which adversely affects the conductive properties of the material, and by converting nanotubes to graphite flakes and amorphous carbon.

For purposes of demonstrating the superior and unexpected properties of the present invention, voltage-capacity data from a multiwalled nanotube film (MWNT) film was collected consistent with the above described techniques. A total capacity of 500 mAh/g was obtained in the first discharge. The reversible part (defined as the capacity displayed in the second discharge) was measured at 250 mAh/g, which is even smaller than the 372 mAh/g ($LiC_6$) theoretical value for graphite. The capacity decreased only slightly upon further cycling. Others have reported capacities ranging from 100–400 mAh/g for MWNT materials. See, e.g.—E. Frackowiak et al.,"*Electrochemical Storage of Lithium Multiwalled Carbon Nanotubes*", Pergamon, Carbon 37 (1999), 61–69.

Voltage-capacity data was also gathered for a mesocarbon microbeads (MCMB) film in the manner described above. The sample showed a reversible capacity of 300 mAh/g.

The excellent capacity of the SWNT materials of the present invention, combined with their superb mechanical and electrical properties, and the ease of forming films, make them attractive electrode materials for high energy density applications such as Li-ion batteries.

Although the present invention has been described by reference to particular embodiments, it is in no way limited thereby. To the contrary, modifications and variants will be apparent to those skilled in the art in the context of the following claims.

What is claimed is:

1. A method of manufacture comprising:
   forming a carbon-based single-walled nanotube-containing material;
   suspending said carbon-based single-walled nanotube-containing material in a suspension medium;
   purifying and recovering said carbon-based single-walled nanotube-containing material;
   creating a mixture by adding said purified and recovered carbon-based material to a solvent; and
   depositing a film of said carbon-based material on at least one surface of a substrate.

2. The method of claim 1, wherein said suspension medium comprises alcohol.

3. The method of claim 1, wherein the carbon-based single-walled nanotube-containing material is suspended with the aid of ultrasonification and an ultrasonic energy is produced by an ultrasonic horn operating at approximately 60 W and 20 kHz.

4. The method of claim 1, wherein said purified and recovered carbon-based single-walled nanotube containing material comprises at least 80% by volume single-walled nanotubes.

5. The method of claim 1, further comprising fracturing, shortening, or creating defects on the side wall of the carbon-based single-walled nanotube-containing material.

6. The method of claim 5, wherein fracturing, shortening, or creating of defects is by mechanically milling or by applying ultrasonic energy to said carbon-based material.

7. The method of claim 6, wherein said milling is conducted for a period of at least one minute.

8. The method of claim 7, wherein said period is 20 minutes or less.

9. The method of claim 8, wherein said period is approximately 5–10 minutes.

10. The method of claim 1, wherein said film is essentially free of binder material and carbon black.

11. The method of claim 1, wherein said substrate comprises a conductive material.

12. The method of claim 11, wherein said conductive material comprises one of copper or nickel.

13. A method of manufacture comprising:
    striking a target with a high-energy laser beam thereby producing an ablated material comprising at least 50% by volume single-walled nanotubes;
    creating a suspension by adding said ablated material to a suspension medium, and introducing ultrasonic energy, thereby suspending said nanotubes within said suspension medium;
    passing said suspension through a filter and recovering said carbon-based material comprising at least 80% by volume carbon nanotubes;
    creating a mixture by adding the recovered carbon-based material comprising at least approximately 80% by volume single-walled nanotubes to a solvent;
    immersing a substrate within the mixture; and
    volatizing said solvent thereby leaving a film of said carbon-based material on at least one surface of said substrate.

14. A method of manufacture comprising:
    creating a mixture by adding a purified and recovered carbon-based nanotube-containing material to a solvent;
    immersing a substrate within the mixture;
    depositing a film of said carbon-based material on at least one surface of said substrate; and
    heat treating said film to promote adhesion to said substrate.

15. A method of manufacture comprising:
    forming a carbon-based single-walled nanotube-containing material;
    suspending said carbon-based single-walled nanotube-containing material in a suspension medium;
    purifying and recovering said carbon-based single-walled nanotube-containing material;
    creating a mixture by adding a purified and recovered carbon-based material to a solvent;
    immersing a substrate within the mixture;
    depositing a film of said carbon-based material on at least one surface of said substrate; and
    heat treating said film to promote adhesion to said substrate.

16. The method of claim 15, wherein the step of depositing the film comprises volatizing said solvent.

17. A method of manufacture comprising:
    striking a target with a high-energy laser beam thereby producing an ablated material comprising at least 50% by volume single-walled nanotubes;
    creating a suspension by adding said ablated material to a suspension medium, and introducing ultrasonic energy, thereby suspending said nanotubes within said suspension medium;
    passing said suspension through a filter and recovering said carbon-based material comprising at least 80% by volume carbon nanotubes;
    creating a mixture by adding the recovered carbon-based material comprising at least approximately 80% by volume single-walled nanotubes to a solvent;
    depositing said carbon-based material on a substrate; and
    volatizing said solvent thereby leaving a film of said carbon-based material on at least one surface of said substrate.

* * * * *